Figure 1:
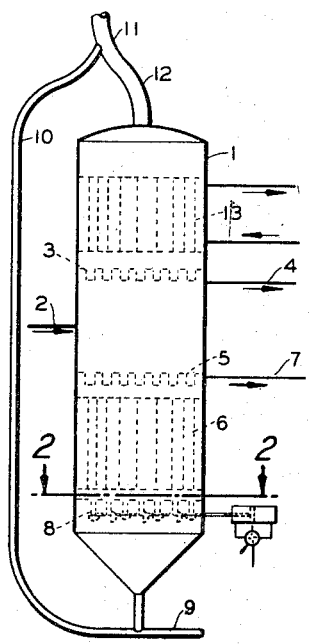

Jan. 8, 1957  H. J. PANKRATZ  2,776,786
FLOW CONTROLLER

Original Filed Dec. 29, 1949  3 Sheets-Sheet 1

INVENTOR.
H. J. PANKRATZ
BY
Hudson & Young
ATTORNEYS

INVENTOR.
H. J. PANKRATZ
BY
Hudson & Young
ATTORNEYS

Jan. 8, 1957 H. J. PANKRATZ 2,776,786
FLOW CONTROLLER
Original Filed Dec. 29, 1949 3 Sheets-Sheet 3

INVENTOR.
H. J. PANKRATZ
BY
Hudson & Young
ATTORNEYS

United States Patent Office 2,776,786
Patented Jan. 8, 1957

2,776,786

FLOW CONTROLLER

Howard J. Pankratz, Bartlesville, Okla., assignor to Phillips Petroleum Company, a corporation of Delaware Original application December 29, 1949, Serial No. 135,564, now Patent No. 2,718,339, dated September 20, 1955. Divided and this application June 17, 1955, Serial No. 516,157

9 Claims. (Cl. 222—486)

This invention relates to an apparatus for controlling a continuous flow of mass of sub-divided solid material. In one of its aspects it relates to an apparatus for controlling in a regulable manner the flow of a catalytic or adsorbent solid sub-divided material employed in a moving bed type catalytic reactor or adsorber.

This application is a division of my prior copending application Serial No. 135,564 filed December 29, 1949, now U. S. Patent No. 2,718,339 of Sept. 20, 1955. Election of species was required in said prior application and the species of Figures 3 to 6 thereof was the elected species therein and the species of Figure 7 was covered subgenerically. The present application is directed to the subgenus of the species of Figure 8 and the species of Figures 9 and 10 of said prior application.

In the prior art many processes are known which employ a solid sub-divided material moving downwardly as a bed through a vertical vessel. Such material is ordinarily a catalyst employed in a chemical reaction such as the catalytic cracking of hydrocarbon oils, or an adsorbent employed in a process for the separation of a mixture of two or more fluids into its component parts. In such processes, it is important that the total rate of flow of the sub-divided solid material be constant at any given rate and that the distribution of flow throughout the cross-sectional area of the process vessel be uniform. Heretofore efforts have been made to secure this desired uniformity of flow by employing such devices as an oscillating feeder tray, slide gates, etc. Although these devices have been quite successful in obtaining the desired uniformity of flow, their opening and closing have resulted in an inordinate amount of crushing and shearing of the particles of the material flowing through them due to the close tolerances between the various moving parts of the apparatus. As a result the consumption of granular material has been excessive and the fines produced by the crushing have often clogged other sections of the apparatus handling the sub-divided solid material. An apparatus which will not crush or shear granular solid material flowing through it and, at the same time, which will secure the desired uniformity of flow has been sought by the prior art as a desirable means for controlling the flow of such material.

According to this invention, there is provided an apparatus for controlling in a regulable manner a continuous flow of a solid sub-divided material whereby there is secured a uniform and continuous flow of the said material through a process vessel without concomitantly crushing or shearing the particles of material to form fines thereof. Still according to this invention, there is provided an apparatus comprising means so adapted to cause a bridge to be formed by particles of the said material which will stop their flow. This bridge is provided by placing a material collecting device across at least a part of the path of solid material discharging from a substantially vertical conduit whereby the particles will accumulate in the collecting device until they effectively plug or partially plug the said conduit. In this manner, the particles of material are not caught and crushed between any closely fitting metallic parts such as those in a valve but, instead, their accumulation on the collecting device will in itself cause their flow to partially or completely cease without any shearing or crushing action whatsoever. As a result the shearing effect on material particles due to their being crushed between moving parts of a flow regulating device is eliminated.

Figure 2:
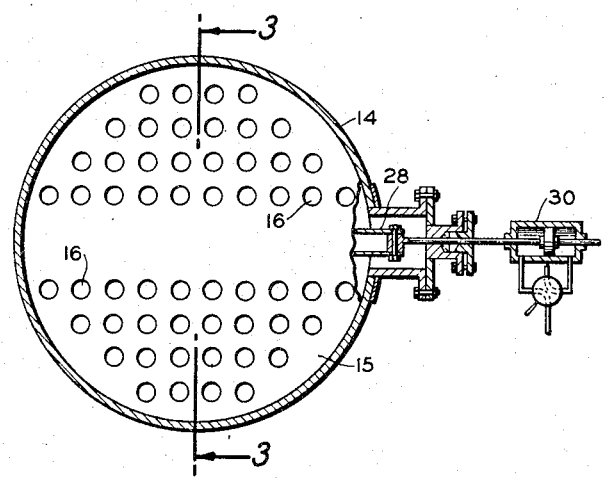
Figure 3:
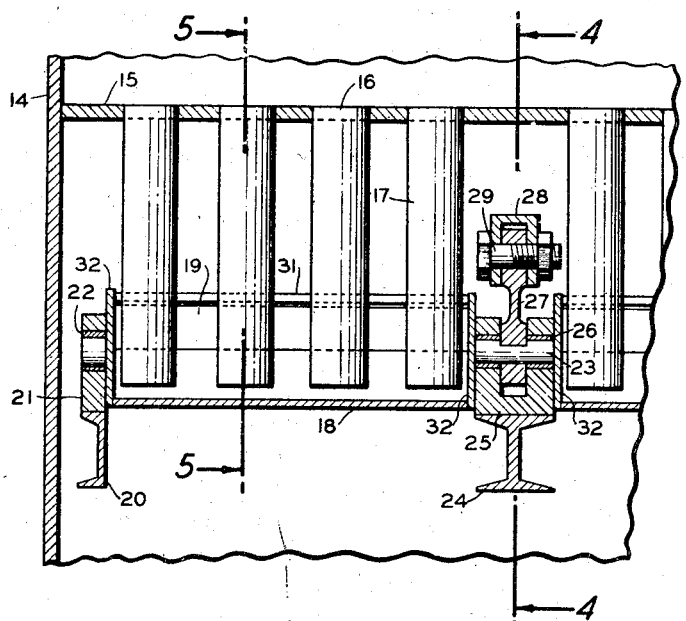
Figure 4:
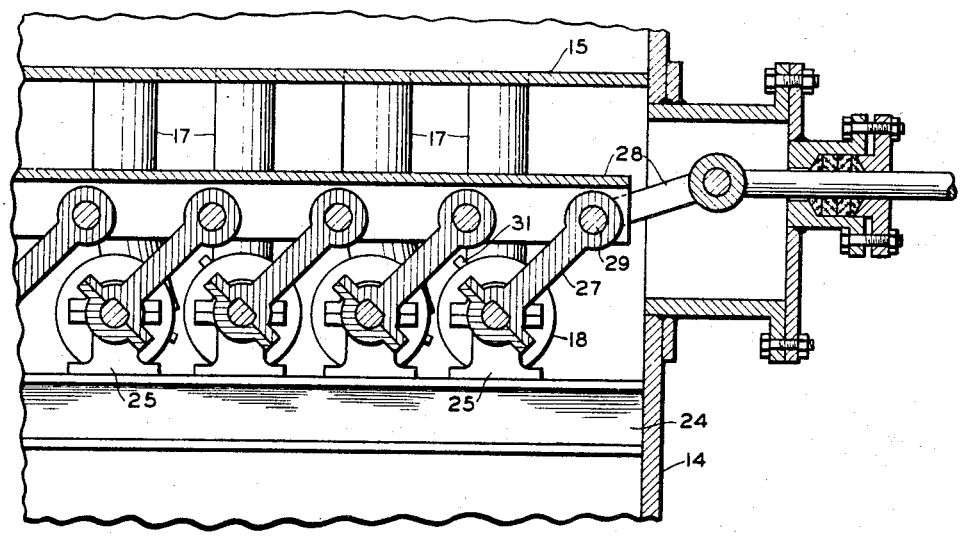
Figure 5:
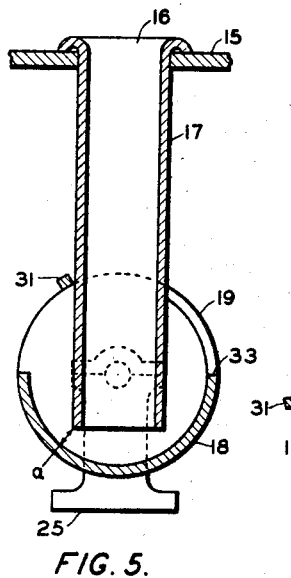
Figure 6:
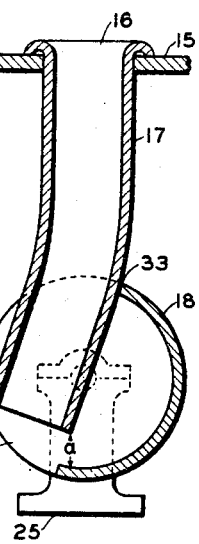
Figure 7:
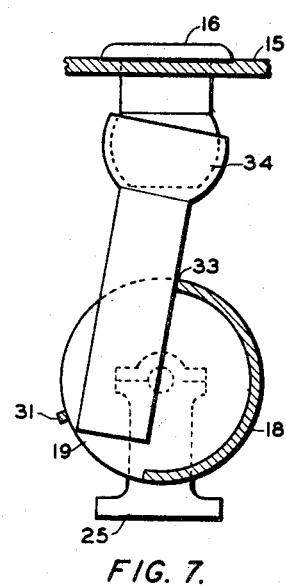
Figure 8:
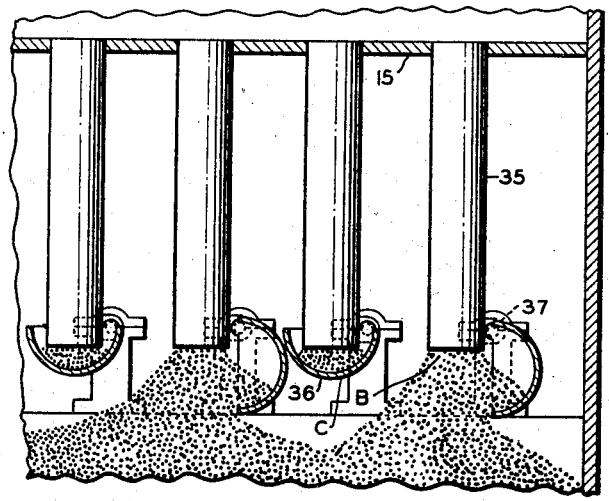
Figure 9:
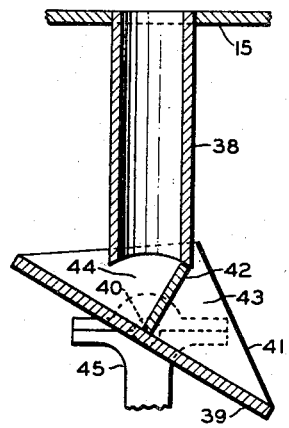
Figure 10:
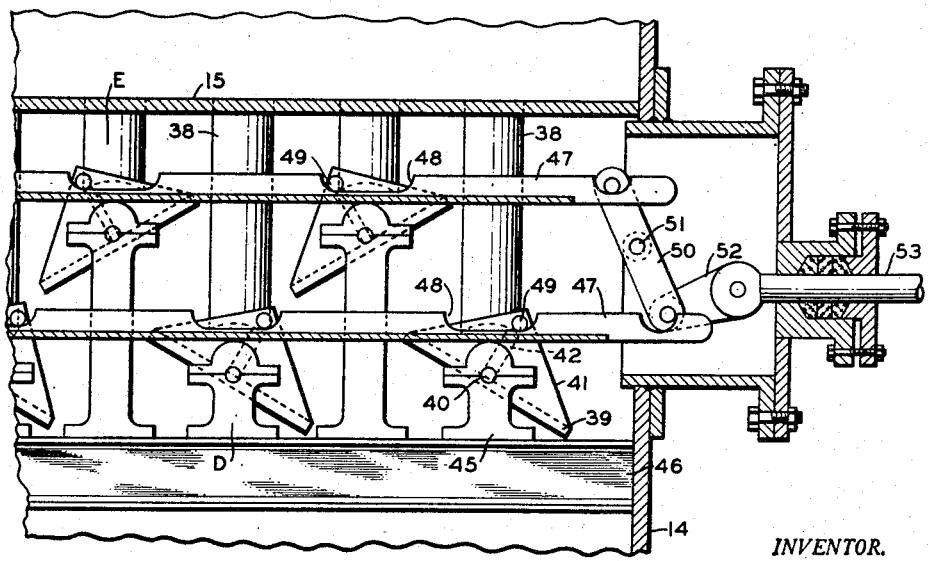

In order to more fully set forth the invention, it will now be described with particular reference to the attached drawings which demonstrate embodiments of the invention. In the drawing, Figure 1 is a schematic view of a hypersorption process and part of the appurtenant equipment in which the apparatus of this invention is particularly adapted to be employed. Figure 2 is a cross-sectional view taken on line 2—2 in Figure 1 showing a portion of the apparatus of this invention located in a vertical, cylindrical vessel. Figure 3 is a sectional view along 3—3 in Figure 2. Figure 4 is a view taken along 4—4 in Figure 3 showing the flow control apparatus in a closed position. Figure 5 is a cross-sectional view taken along 5—5 in Figure 3. Figure 6 is a view corresponding to that of Figure 5 except that the flow control apparatus is shown in an open position. Figure 7 illustrates a modification of the embodiment shown in Figures 5 and 6. Figures 8, 9 and 10 illustrate other embodiments of the apparatus than those shown in Figures 3, 4, 5 and 7.

Referring to Figure 1, there is shown a portion of the equipment employed in a hypersorption process for separating a mixture of fluids into its components by selective adsorption onto an adsorbent such as apricot pit or coconut charcoal. In the figure, the feed mixture to be separated enters vessel 1 through line 2 and flows upwardly and countercurrently to a bed of adsorbent flowing continuously downward in the vessel 1. The least readily adsorbed component of the feed is not adsorbed by the adsorbent material and disengages from the moving bed of adsorbent at disengaging tray 3 and leaves vessel 1 through line 4. The adsorbent material containing the most readily adsorbed component of the feed flows downwardly as a bed through disengaging tray 5 and through heating section 6 wherein it is heated sufficiently to strip the adsorbed component therefrom. This stripped component leaves vessel 1 through line 7. The hot, stripped adsorbent then passes through a flow regulating and controlling apparatus generally designated as 8 in Figure 1. This apparatus, which this invention particularly concerns, provides a means for controlling the rate of flow of adsorbent downwardly through the vessel as well as a means for uniformly controlling the flow across a given cross-sectional area of the vessel 1 above the apparatus 8. In this particular process, it is particularly important that the flow of adsorbent through the vessel is uniform in such a manner that the rate of flow at the center of the vessel is the same as that at the edges of the vessel in order that the feed to be separated will be uniformly contacted with all of the flowing adsorbent. After passing through apparatus 8, the adsorbent is picked up by a gaseous carrier in line 9 and elevated to the top of the vessel 1 through line 10 where the adsorbent is disengaged from the carrier in separating device 11. This device is particularly designed to permit adsorbent material-gas separation without any substantial crushing or disintegration of the adsorbent into fines. The separated adsorbent then flows through line 12 to vessel 1 wherein it is cooled in cooler 13 and passed through disengaging tray 3 to complete the cycle. As stated, the apparatus of this invention is particularly concerned with the adsorbent flow controlling and regulating apparatus 8 shown in Figure 1. However it is to be understood that the apparatus of this invention can be advantageously employed in other processes wherein it is necessary to regulate the flow of a sub-divided solid mass such as in moving or fluid bed catalytic hydrocarbon treating processes, chemical reactions employing a moving catalyst, limestone converting processes, cement calcining processes, etc.

Referring to Figures 2, 3, 4, 5 and 6, a vertical reaction or adsorption vessel formed by wall 14 has a tray 15 disposed across its cross-section. Tray 15 has a plurality of apertures 16 in which are situated conduits 17. Conduits 17 are substantially flush at their upper end with tray 15 and extend downwardly from tray 15 for a substantial distance, say from six inches to three feet. The lower ends of conduits 17 terminate inside a collector 18 which is comprised of a tube having cutaway a portion 19 so that the tube is semi-circular or trough-shaped in cross-section and thereby adapted to receive the ends of conduits 17 therein as shown in Figures 5 and 6. Conduit 17 should extend into collector 18 and preferably leave a sufficient clearance "a" between the end of the conduit and the inside of the collector so that the solid material will not be crushed by the oscillation of collector 18. Usually a clearance of 6 to 8 times the diameter of the particles of the solid sub-divided material is sufficient. Collector 18 extends across the vessel and thereby serves a number of conduits 17 disposed across the vessel in a straight line as shown in Figure 2. Collector 18 is supported from the walls 14 of the vessel by support 20 and bearing standards 21 wherein a bearing 22 is situated so as to permit collector 18 to turn or oscillate about a longitudinal axis. Collector 18 is divided midway along its length and a connecting link 23 interconnects the two halves of the collector. Supporting member 24 can be attached to walls 14 in order to support a central bearing standard 25 containing bearing 26. Attached to link 23 is an arm 27 to which a linkage 28 is secured by a bolt 29. Linkage 28 thereby operatively connects collector 18 to an actuating device 30 located outside the vessel. Actuator 30 is diagrammatically shown as a fluid operated piston which operates to reciprocate linkage 28 back and forth thereby oscillating collector 18 about a longitudinal axis. A bar 31 is fastened in the cutaway portion 19 of collector 18 and across the length of collector 18 by its attachment to end plates 32 of collector 18 thereby being adapted to press against conduit 17 when collector 18 is oscillating to a closed position as shown in Figure 5.

In operation, the particles of material flow downwardly through conduit 17 and, as shown in Figure 6, out its end without restriction. When it is desired to stop the flow of the particles, actuator 30 pulls linkage 28 so as to rotate collector 18 to the position shown in Figure 5. In so doing, bar 31 presses against conduit 17 thereby displacing it to the center of collector 18 in which position its longitudinal axis intersects the longitudinal axis of collector 18. In such position, the particles of flowing material pile up in collector 18 until they bridge across the lower end of conduit 17 thereby stopping their flow. When flow of the particles is again desired, collector 18 is rotated to the position shown in Figure 6. In so doing, the edge 33 of collector 18 pushes conduit 17 away from the center of collector 18 whereby the particles can freely flow through conduit 17. Collector 18 can be rotated to any intermediate position so as to only partially bridge conduit 17 whereby the flow of particles is partially restricted.

As described above, conduit 17 can be of any type which can be retained in hole 16 of tray 15 and yet have its solid material discharge end displaceable laterally as shown in Figure 6. Thus, it is contemplated that conduit 17 can be substantially rigid and loosely fitted in hole 16 so that the conduit can be laterally displaced at its discharge end. It is further contemplated that conduit 17 can be of flexible structure and/or material. Still further, conduit 17 can contain a ball and socket 34 as shown in Figure 7 so that it is readily movable at its discharge end. It is preferred that conduit 17 be flexible in order that its frequent flexing will prevent clogging thereof. Conduit 17 can be squared, round, rectangular or any desired shape in cross-section.

Although shown divided in Figure 3, it is apparent that collector 18 can comprise one length extending entirely across a row of conduits 17 thereby eliminating connecting link 23. On the other hand collector 18 can be divided into a plurality of independent or interconnected sections each serving as a collector for an individual conduit 17. In such cases, arm 27 and linkage 28 can readily be modified to cooperatively connect each collector with an external actuating device 30. Although collector 18 is shown as semi-circular in cross-section in Figures 3, 4, 5 and 6, it is contemplated that they can be of any form which will serve as a collector for bridging the flowing granular material across conduit 17. Thus it can be trough-shaped or it can be a tube or pipe slotted along its length to receive the ends of conduits 17 therein.

A plurality of collectors 18 and conduits 17 can be provided and so arranged that all of collectors 18 are either open or closed at the same time. In this manner, the rate of flow of material through the apparatus of this invention can be positively controlled by controlling the length of time the collectors are oscillated to open position and by controlling the rate of oscillation to obtain the desired flow. Such an arrangement also permits total cessation of flow of material and hence can be used as a shut-off device.

One of the features of the apparatus of this invention is that the flow of solid sub-divided material through the process vessel served by the said apparatus be maintained uniform throughout any given cross-section of the vessel as well as at a constant rate for any given rate of flow therethrough. To accomplish this feature, a plurality of collectors 18 and conduits 17 are provided and so arranged that when at least one collector 18 is in a closed position as shown in Figure 5, at least one other collector 18 is in an open position as shown in Figure 6 whereby material is constantly flowing through tray 15. Other collectors 18 can be positioned so as to be only partially opened or closed with respect to those open and closed at any one time thereby providing a still more uniform flow. The relative positions of the collectors 18 can be easily adjusted by adjusting the position of the connecting link 23 in respect to the arm 27. Further, collector 18 can be oscillated on a cyclical basis or it can be fixed at a partially open position thereby securing the desired rate of flow of material through conduit 17. Thus there is provided an apparatus which ensures a constant total flow at any given flow rate and a uniform cross-sectional flow of solid sub-divided material through a vessel without any substantial crushing or shearing of the material into fines since the material is not caught between any closely fitted parts between which the material must flow. Alternatively, when an intermittent flow of material is desired, all of the collectors 18 can be made to open and close simultaneously.

Figure 8 illustrates another embodiment of this invention wherein conduit 17 or Figure 3 has been replaced with an inflexible conduit 35 affixed to a tray 15. Collectors of receptacles 36 are oscillatably mounted at their ends at point 37 whereby the receptacles 36 can be oscillated so as to close the end of conduit 35 in order to permit bridging of conduit 35 as shown in Figure 8. The receptacles can be mounted similarly to collector 18 in Figure 3. A suitable linking mechanism and actuator similar to that shown in Figures 2 and 3 can be provided to oscillate receptacles 36 about an axis 37 which is parallel to a line of conduits lying behind conduit 35 in Figure 6. This axis should be situated with respect to conduits 35 so that the collector can be oscillated to a position such that conduit 35 extends into the collector a sufficient distance that the solid material will form therein a bridge across the conduit 35 and yet one which permits a clearance between the end of conduit 35 and the inside surface of collector 36 to avoid crushing the solid material between closely fitting parts.

In operation, full flow of the particles of material is permitted when the receptacles 36 are rotated to a position shown at "B" in Figure 8. Rotation to a position "C" as in Figure 8 permits the particles to accumulate in receptacles 36 so as to bridge across the conduit 35 thereby stopping their flow without any crushing or shearing.

It is understood that the above described embodiment can be modified. Thus, receptacle or collector 36 can be any trough-shaped, V-shaped or semi-circular section which will serve to accumulate therein sub-divided solid material flowing from conduit 35. Further, collector 36 can be adapted to serve only a single conduit 35 instead of a row of conduits as described. In such case, collector 36 will be in the shape of any ordinary receptacle such as a cup or a hollow hemisphere. It is to be understood that collectors 36 can be operatively actuated so as to all be open or all closed at any one time. It is also to be understood, in accordance with a preferred feature of this invention, that the receptacles 36 can be operatively connected with an actuating device such as that shown in Figures 2 and 3 whereby at least one of the receptacles will be in a closed position while at least one other is in an open position as described with reference to the embodiment shown in Figures 3, 4, 5 and 6. Thus the embodiment shown in Figure 8 will likewise secure a uniform continuous flow of sub-divided solid material without crushing the same.

Figures 9 and 10 illustrate an additional embodiment of the apparatus of this invention wherein conduits 38 depend from a tray 15. Located at the lower ends of a row of conduits 38 are collectors comprising inverted T-sections 39 pivotally mounted at their ends at axis 40 and having their ends closed by a section 41. Leg 42 of T-section 39 extends upwardly to the mouth of conduit 38, so as to form a pair of receptacles 43 and 44 as well as a diverting barrier when in the position shown in Figure 9. In this position, a receptacle 44 is formed beneath conduit 38 wherein the flowing particles of material will accumulate and eventually bridge across the lower end of conduit 38 thereby stopping flow therethrough. The lower end of conduit 38 is cut in an arc about point 40 so that leg 42 can form an effective seal along opposite sides of conduit 38. T-section 39 can be supported by bearing standards 45 situated on support 46 attached to walls 14. In operation, the inverted T-sections 39 oscillate back and forth to the positions "D" and "E" as shown in Figure 10 whereby the flow of material through conduit 38 flows alternately into adjacent receptacles 43 and 44. The flow of granular material through conduit 38 is regulated by regulating the speed of oscillation of the T-sections. Suitable operating linkages and an actuator as in Figures 2 and 3 can be provided to oscillate collectors 39 to positions "D" and "E" in order to secure a regulated and positive oscillation of the collectors. In Figure 10, such an operating linkage is shown as comprised of members 47 having slots 48 adapted to receive a bearing pin 49 which is attached to end 41 of T-section 39. The ends of members 47 can be connected by link 50 as shown. Link 50 has a fixed pivot point 51 and is connected by link 52 to a linkage 53 which is operatively connected to an actuating means (not shown). In operation, linkage 53 is reciprocated back and forth thereby causing members 47 to likewise reciprocate but in opposite directions to each other. This reciprocation causes T-sections 39 to oscillate back and forth about point 40. Slots 48 permit the weight of the material contained in receptacles 43 and 44 to semi-automatically assist in oscillating T-sections 39.

It is to be understood that although the collectors of Figures 9 and 10 have been described as inverted T-sections, they can be comprised of any section having adjacent receptacles mounted so as to oscillate first one and then the other receptacle across the discharge end of conduit 38. Thus the legs perpendicular to leg 42 of the T-section shown can be curved to form more pronounced adjacent receptacles than those shown in the drawing. Further, collector 39 can be readily adapted to serve a row of conduits or a single conduit. It is to be further understood that collectors 39 can be so attached to their oscillating linkages that at least one collector is at position "E" while at least one other is at position "D".

It is further contemplated that the collectors of Figures 9 and 10 can be adapted to operate automatically without any positive actuating mechanism by balancing the collectors so that the weight of material flowing into a first receptacle of the collector will cause that collector to oscillate so that a second receptacle will be under the conduit 38 thereby filling it while the first receptacle is emptying. This action will be constantly repeated so as to secure a continuous flow of material through the process vessel. The rate of oscillation of the collector in such case can be controlled by adjusting the volume of the adjacent receptacles or by providing loading springs attached to each receptacle and to a stationary point in order to bias the oscillation of the collector.

It is apparent from the foregoing description of the invention that there is provided a means for controlling in a regulable manner a flow of solid sub-divided material without any crushing or shearing of the particles of material. It is to be especially noted that the provision of the collectors of this inention in conjunction with conduits through which is flowing a solid sub-divided material affords a surge chamber for the material in the form of the collectors associated with the said conduits. Thus, when a collector is oscillated into a closed position about the end of a conduit, the flow of material through the conduit is not immediately stopped but continues to flow until sufficient material accumulates in the collector to bridge across the end of the associated conduit. The flow of material is not thereby suddenly halted so as to cause additional crushing and shearing of the particles of material.

The flow controllers of this invention can be advantageously employed in combination with a solid material surge vessel. Referring to Figure 1, it is often desirable to provide a surge chamber in the bottom of vessel 1 in order to provide a flexible system of solid material flow control. In such case, flow controller 8 can be provided as shown and an additional flow controller (not shown) can be situated in vessel 1 a suitable distance below controller 8 in order to provide a chamber therebetween which will act as a surge chamber. Thus, flow controller 8 can be operated to secure the desired rate of solid material flow through heating section 6 and superposed sections while the flow controller below controller 8 can be operated to secure the desired rate of feed of solid material to line 10 in order to avoid overloading line 10.

While the invention has been described in connection with a present, preferred embodiment thereof, it is to be understood that this description is illustrative only and is not intended to limit the invention, the scope of which is defined by the appended claims.

I claim:

1. In an apparatus for controlling in a regulable manner a continuous flow of a mass of sub-divided material, in combination; a plurality of conduits placed in the line of flow of said material; a material collector coacting with the discharge end of each of said conduits, said collector comprising adjacent receptacles mounted to rotate at each of said discharge ends of said conduits; an actuator operatively connected to said collector to rotate it so that at least one of said receptacles receives while at least one other discharges material from said conduit.

2. In an apparatus for controlling in a regulable manner a continuous flow of a mass of sub-divided material, in combination; a plurality of conduits placed in the line of flow of said material; a material collector coacting with the discharge end of each of said conduits, said collector comprising an inverted T-section mounted to rotate under the said conduit so that the legs of the said T-section form adjacent receptacles at the discharge end of said conduit; an actuator operatively connected to and adapted to rotate said collector so that said receptacles alternately receive and discharge material from the said conduit without crushing the said material.

3. In an apparatus for controlling in a regulable manner a continuous flow of a mass of sub-divided material, in combination; a substantially horizontal tray; a plurality of conduits depending from and attached at one end to said tray, said conduits being arranged in a plurality of rows across said tray; a plurality of material collectors each coacting with the lower ends of a row of said conduits, each of said collectors comprising an inverted T-section mounted to rotate about the intersection of the legs of said T-section and situated so that the outer end of the leg perpendicular to the other two legs of the section rotates from one edge of said conduit to the opposite edge thereby forming adjacent receptacles which alternate in receiving and discharging said material from said conduit; and an actuator adapted to rotate each of said collectors; said collectors being operatively engaged by said actuator.

4. Apparatus for controlling the flow of a mass of solid sub-divided material comprising, in combination, a chamber having an outlet, a rigid conduit disposed in communication with said outlet and secured immovably to said chamber, a collector mounted to rotate on a pivot fixed relative to said chamber and said conduit, said collector being adapted and disposed below said conduit in one rotational position to cause said material flowing out of said conduit to bridge and stop said flow.

5. The combination of claim 4 in which the collector is semicylindrical in cross section and is pivoted on an axis parallel to the axis of said semicylinder.

6. The combination of claim 5 in which said axis of said pivot is adjacent and parallel to one edge of said semicylinder.

7. The combination of claim 4 in which the collector is an inverted T bar.

8. The combination of claim 7 in which the collector is pivoted on an axis parallel to the longitudinal axis of said inverted T bar.

9. The combination of claim 8 in which said axis of said pivot is adjacent and parallel to the line of intersection of the shank and cross bar elements of said inverted T bar.

References Cited in the file of this patent

UNITED STATES PATENTS

| 2,486,200 | O'Connor | Oct. 25, 1949 |
| 2,661,868 | Siren | Dec. 8, 1953 |